United States Patent [19]

Serot

[11] Patent Number: 5,368,339

[45] Date of Patent: Nov. 29, 1994

[54] NETWORK FOR DISTRIBUTION FLUID UNDER PRESSURE, A BRANCH CLAMP FOR USE IN THE NETWORK, AND A KIT FOR MAKING A BRANCH CONNECTION

[75] Inventor: Pierre Serot, Fontenay-aux-Roses, France

[73] Assignee: Legris S.A., Rennes, France

[21] Appl. No.: 74,489

[22] Filed: Jun. 11, 1993

[30] Foreign Application Priority Data

Jun. 15, 1992 [FR] France ........................ 92 07189
Jun. 15, 1992 [FR] France ........................ 92 07188

[51] Int. Cl.⁵ ............................................ F16L 41/06
[52] U.S. Cl. .................................. 285/150; 285/197; 285/420; 206/304.2
[58] Field of Search .............. 285/197, 198, 199, 12, 285/420, 150; 206/120.6, 304.2, 231, 440

[56] References Cited

U.S. PATENT DOCUMENTS

| | | | |
|---|---|---|---|
| 381,921 | 5/1888 | Gennert | 285/197 |
| 1,843,191 | 2/1932 | Balze | 285/197 |
| 2,790,652 | 7/1951 | Risley et al. | |
| 3,011,755 | 7/1958 | Babson | |
| 3,489,441 | 1/1970 | Malcolm | 285/197 |
| 3,734,112 | 5/1973 | Finney et al. | |
| 4,067,353 | 10/1978 | Dehoff | |
| 4,391,458 | 7/1983 | Blakeley | 285/197 X |
| 4,411,459 | 10/1983 | Ver Nooy | 285/197 |

FOREIGN PATENT DOCUMENTS

| | | | |
|---|---|---|---|
| 0646131 | 11/1928 | France | 285/197 |
| A039846 | 3/1932 | France | 285/198 |
| 1486484 | 5/1966 | France . | |
| 1561422 | 3/1969 | France | 285/197 |
| 1190133 | 1/1988 | France . | |
| 601874 | 8/1934 | Germany . | |
| 0757430 | 9/1956 | United Kingdom | 285/197 |
| 2074682 | 4/1980 | United Kingdom . | |

Primary Examiner—Randolph A. Reese
Assistant Examiner—Heather Chun Shackelford
Attorney, Agent, or Firm—Griffin, Butler, Whisenhunt & Kurtossy

[57] ABSTRACT

A network for distributing a fluid under pressure. The network has a substantially horizontal main pipe situated at an upper level, with horizontal or vertical secondary pipes branching therefrom. The junction between the main pipe and a secondary pipe is provided by a branch clamp having a zone for covering at least one orifice formed in the top half-cylinder of the wall of the main pipe, into which zone there opens out a first end of a branch duct internal to the clamp, the other end of the duct being fitted with a coupling for coupling the clamp to the secondary pipe. The axis of the first end of the branch duct and the axis of the coupling form an angle a which is obtuse when measured between the axes in the flow direction of fluid flowing along the branch duct.

14 Claims, 3 Drawing Sheets

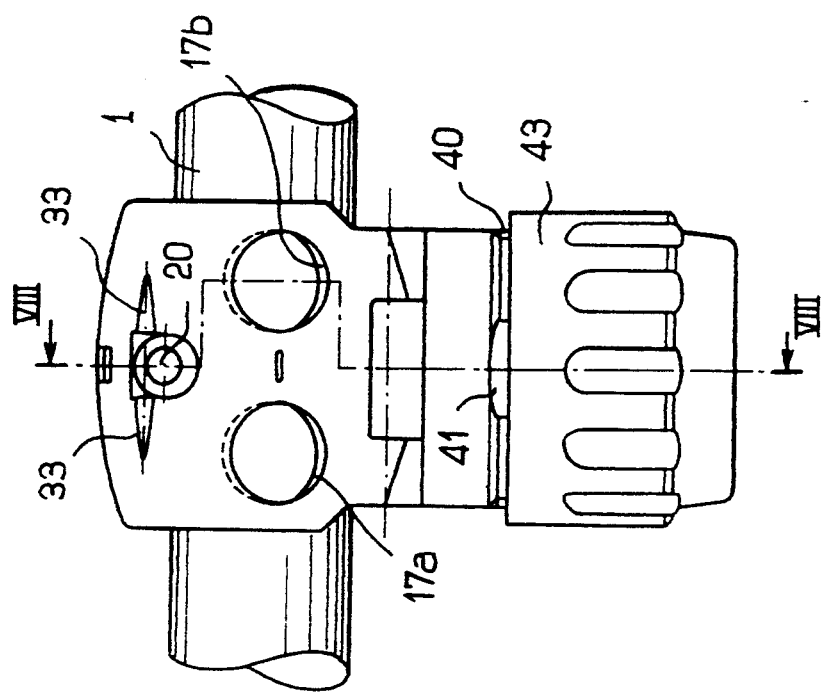
FIG_7
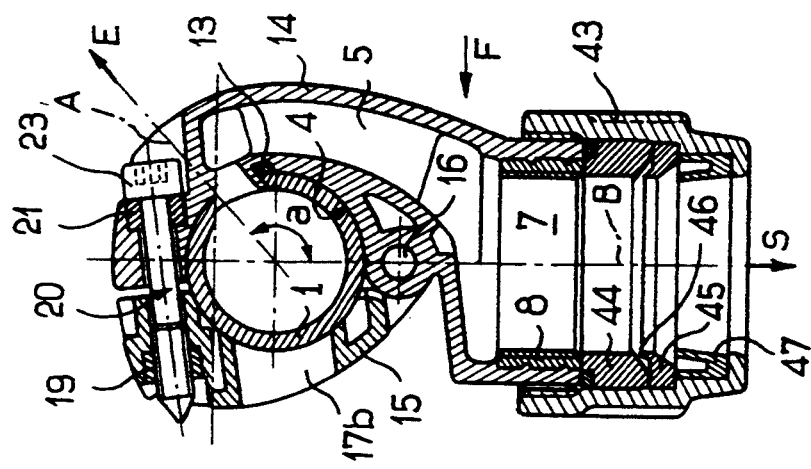
FIG_8
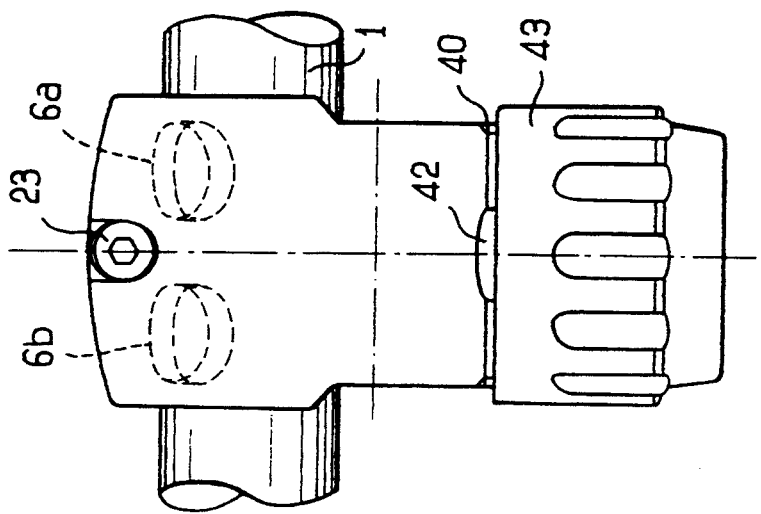
FIG_9

NETWORK FOR DISTRIBUTION FLUID UNDER PRESSURE, A BRANCH CLAMP FOR USE IN THE NETWORK, AND A KIT FOR MAKING A BRANCH CONNECTION

The present invention relates to means for implementing a network for distributing fluid under pressure, in particular compressed air, the network comprising a main pipe having a plurality of secondary pipes connected thereto.

BACKGROUND OF THE INVENTION

At present, the distribution of compressed air in industrial premises is somewhat akin to plumbing in the sense that it is essentially made-to-measure, with pieces of tube being cut to the required length on site for fitting to the geometry of the premises, and with the lengths being connected to one another in order to build up a continuous main pipe that goes past workstations or groups of workstations requiring compressed air, with tapping points being provided on said main pipe from which the compressed fluid is taken to points of use. In general, such a main distribution line is located high up in industrial premises and secondary lines constitute vertical down pipes running from said high pipe, or else they constitute secondary horizontal pipes from which further vertical ramifications can be extended.

In general, branch lines are connected to the main line via swannecks, particularly when the network distributes compressed air, since the bottom portion of the main line collects condensation water and it is desirable to avoid entraining said water towards machines that use the compressed air.

OBJECTS AND SUMMARY OF THE INVENTION

The present invention seeks to remedy the drawbacks of traditional installations, i.e. an installation process which is lengthy and expensive, and above all which gives rise to a "frozen" setup that is unsuitable for being adapted to changing needs, whereas in present industrial processes, in particular fabrication or assembly processes, it is necessary to have installations that can be modified as to floor plan and number of individual work units used.

To provide better satisfaction for this requirement of modern industry, the present invention provides firstly a network for distributing a fluid under pressure, the network comprising a substantially horizontal main pipe situated at an upper level, with horizontal or vertical secondary pipes branching therefrom, wherein the junction between the main pipe and a secondary pipe is provided by means of a branch clamp having a zone for covering at least one orifice formed in the top half-cylinder of the wall of the main pipe, into which zone there opens out a first end of a branch duct internal to the clamp, the other end of said duct being fitted with coupling means for coupling the clamp to the secondary pipe, the axis of the first end of the branch duct and the axis of said coupling means forming an angle a which is obtuse when measured between said axes in the flow direction of fluid flowing along the branch duct. Such a coupling clamp therefore includes in itself means enabling the same results to be achieved as when using a swanneck.

Preferably, the axis of the first end intersects the axis of the coupling means of the clamp at 135°. Also, and advantageously, said axes intersect on the axis of the main pipe when the clamp is mounted on said pipe, thereby making it possible to cause the axis of the main pipe and the axis of the secondary pipe to intersect, consequently achieving a better distribution of the forces that may act between these two pipes (by eliminating a twisting component that would otherwise be generated by said forces when the coupling means are offset relative to the axis of the main pipe).

Depending on the flow rate desired in the secondary pipe, the wall of the main pipe may include one or more orifices, always in its top semicylindrical portion, which orifices are covered by a single zone of the clamp.

Secondly, the invention also provides the branch clamp, itself for use in a network as defined above to provide the coupling between a secondary distribution pipe and a main pipe, said clamp comprising two half-collars that are hinged to each other and whose free ends have complementary means for closing the clamp and clamping it on the main pipe, one of the half-collars including, internally, the above-defined branch pipe whose first end opens out into the overlap zone via at least one opening that is extended by an endpiece for centering the clamp on the orifice in the main pipe. This centering endpiece constitutes the means for ensuring that the clamp is properly mounted on the main pipe. It also constitutes indexing means whose position relative to the coupling endpiece of the clamp is accurately known, making it possible, by rotating the length of main pipe on which the clamp is mounted, to ensure that the tapping point of the secondary pipe on the main pipe is provided above the level of any water that may stagnate in said main pipe.

BRIEF DESCRIPTION OF THE DRAWINGS

Other characteristics and advantages appear from the description given below of embodiments of the invention.

Reference is made to the accompanying drawings, in which:

FIG. 7 is an outside view of a clamp of the invention having two tapping orifices;

FIG. 8 is a section on line VIII—VIII of FIG. 7; and

FIG. 9 is a view along arrow F of FIG. 8.

Figure 1:
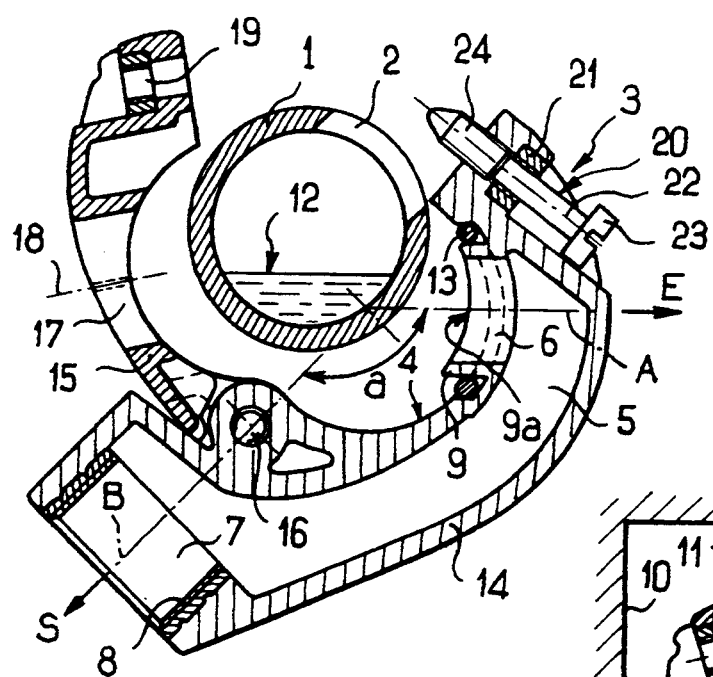
FIG. 1 is a cross-section through a main pipe of a network in accordance with the invention showing an open clamp for making a branch connection to said main pipe.

In the drawings, reference 1 designate a main pipe of a network in accordance with the invention for distributing fluid under pressure.

MORE DETAILED DESCRIPTION

The term "main pipe" is used below to designate any pipe in the network that includes a branch connection, i.e. a tapping point from which another pipe extends.

The main pipe 1 has an orifice 2 whose diameter is such that, in section, it subtends an angle at the center of less than 90°. This condition makes it possible to conserve sufficient rigidity in the tubular wall of the pipe 1 when engaged with the branch clamp as described below. Should a larger through section be necessary for satisfying the needs served by the secondary pipe branching from the main pipe 1, the number of orifices along a common generator line of the pipe 1 may be doubled or tripled.

In accordance with the invention, a branch from said pipe 1 is obtained by installing a clamp 3 having the following essential characteristics. Firstly it includes a zone 4 suitable for overlying the region of the pipe adjacent to the orifice 2 in leakproof manner. It also includes a branch duct 5 having a first end 6 that opens out through said zone 4 so as to be capable of being placed to face the orifice 2, and having a second end 7 fitted with coupling means 8 for coupling to the secondary pipe that is to branch from the main pipe 1. A final main characteristic of this coupling clamp is that the axis at the end 6 of the branch duct 5 (referenced A in the figures) forms an obtuse angle a with the axis B of the coupling means 8 disposed at the other end of the branch duct 5. In the example shown in these figures, the angle a is equal to 135°. It may be observed that the angle a is measured between the axes in the direction in which the fluid flows along the branch duct 5, i.e. between the vector E which is colinear with the axis A and the vector S which is colinear with the axis B. Under such conditions, the clamp presents the characteristics of a swanneck coupling.

Another characteristic of this branch clamp lies in the fact that the end 6 of the duct 5 opens out in the zone 4 of the clamp 3 via an endpiece 9 that projects from the surface that delimits said zone 4 and that is suitable for being inserted into the orifice 2. A first function of the endpiece is to index the end 6 relative to the orifice 2 so as to be certain that the inside volume of the pipe 1 is in communication with the inside volume of the branch duct 5.

Figure 2:
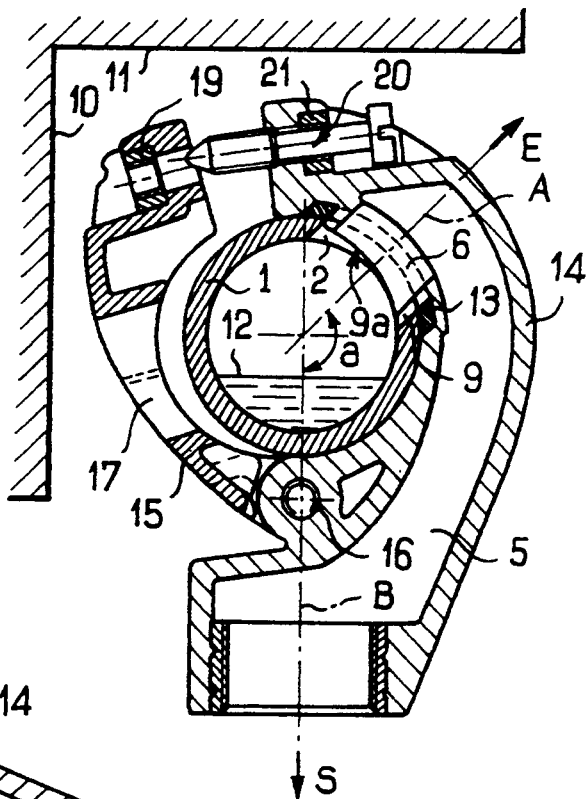
FIG. 2 shows a clamp in accordance with the invention on a main pipe disposed in an upper corner of premises, the branch pipe extending downwards.
Figure 3:
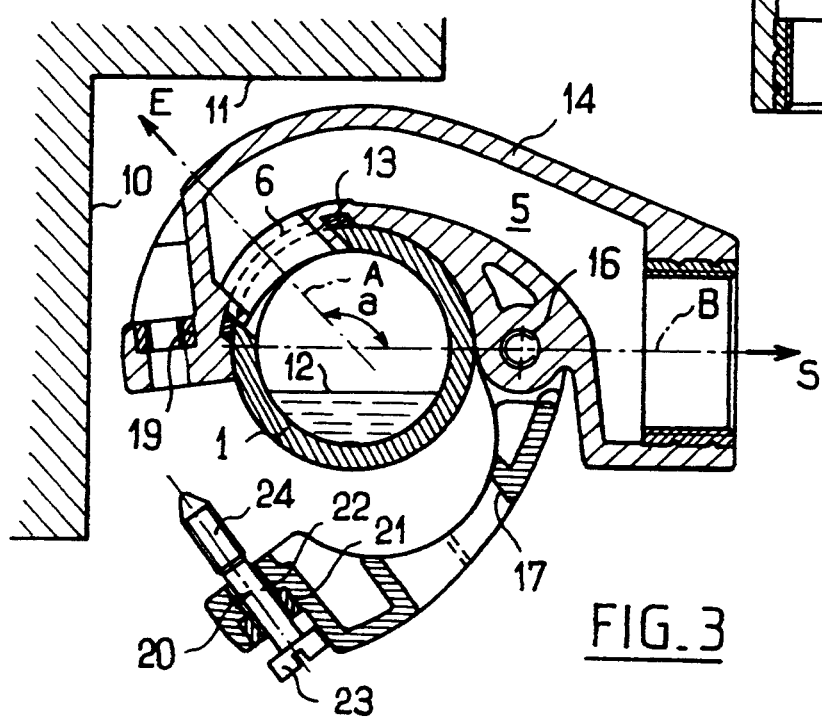
FIG. 3 is a figure identical to FIG. 2 except that the branch pipe extends horizontally, level with the main pipe.

FIGS. 2 and 3 illustrate the fact that a main pipe 1 is generally situated in an upper corner between a vertical wall 10 and a ceiling 11 of industrial premises. Pipework branching from said main pipe can therefore, in practice, extend in only two possible directions: vertically with the coupling clamp disposed in the orientation shown in FIG. 2; or horizontally with the clamp then being placed in the disposition shown in FIG. 3. It will be understood from these figures that given the above-specified structure and characteristics of the clamp, merely orienting the clamp to obtain a horizontal start or a vertical start ensures that the orifice 2 is correctly positioned, i.e. that it is in the top half of the cylindrical wall of the pipe 1, above the level of any condensation water 12 that may collect in said pipe 1. Assuming that the orifice 2 is formed in a length of pipe 1 that is free to rotate about its own axis, e.g., because its ends are not yet finally secured to the remainder of the network, an operator seeking to place the clamp 3 on said length begins by inserting the endpiece 9 in the orifice 2 and then rotates said length so as to obtain a horizontal start or a vertical start, as required. In order to enable the clamp to be appropriately secured, the operator must be able to access its clamping and fixing members as described below. Such access is always possible, regardless of the disposition of said members, providing the pipe 1 can be rotated about its own axis. Access is also possible if the clamp 3 is premounted on a length of pipe 1 prior to installing said length in the corner between a wall 10 and a ceiling 11.

The zone 4 for covering the portion of pipe 1 surrounding the orifice 2 has a groove around the endpiece 9 for the purpose of supporting a sealing ring 13.

The clamp 3 thus includes a first part 14 which includes the branch duct 5 terminating at the endpiece 9 and at the coupling means 8, and which defines the zone 4 that is fitted with the sealing ring 13. The zone 4 is substantially semicylindrical, and the clamp 3 includes a second part 15 hinged to the part 14 about an axis 16 parallel to the axis of the zone 4, said part 15 forming a half-collar capable of co-operating with the zone 4 to surround the pipe 1 completely. The hinge axis 16 is preferably constituted by a standard resilient pin. Like the zone 4, the part 15 has an inside surface that is substantially semicylindrical.

Opposite from the hinge axis 16 which unites them, the parts 14 and 15 have fastening means enabling their free ends to be connected together. These means comprise a nut 19 secured in the free end of the part 15 (FIGS. 1, 2, 4, 5, 6, and 8) while the part 14 has a screw 20 held in an orifice through an end lug of said part 14 (see the same figures) by a nut 21 secured in said lug.

In FIG. 3, it will be observed that the nut 19 is carried by the part 14 while the screw 20 is situated at the end of the part 15. It may be advantageous to be able to reverse the means for fastening the clamp on the pipe 1 so as to make them accessible in either of the positions of the clamp as shown in FIGS. 2 and 3, and assuming that the length of pipe 1 has been secured against rotation before the clamp is installed. This reversal is made possible by the fact that the nuts 19 and 21 are identical and the screw has a smooth portion of shank 22 between its head 23 and its threaded end 24, the threaded end 24 being capable of co-operating with either of the nuts 19 and 21 while the smooth shank 22 is smaller in diameter than the inside diameter between the threads in the nuts. Thus, depending on the direction in which the screw 20 extends, one of the nuts 19 and serves as the nut for receiving the screw 20 to close the clamp, while the other one of the nuts serves as a retaining ring for holding the screw captive once its threaded end 24 has been screwed through the nut.

In FIGS. 1 to 3, it should be observed that there is a cylindrical opening 17 through half-collar part 15 about an axis 18 that extends radially relative to the inside cylindrical surface of said half-collar. The diameter of this opening is determined by the diameter of the orifice 2 that the pipe 1 needs to have in order to co-operate with a clamp of the invention, as described below with reference to FIGS. 4 and 5.

Figure 4:
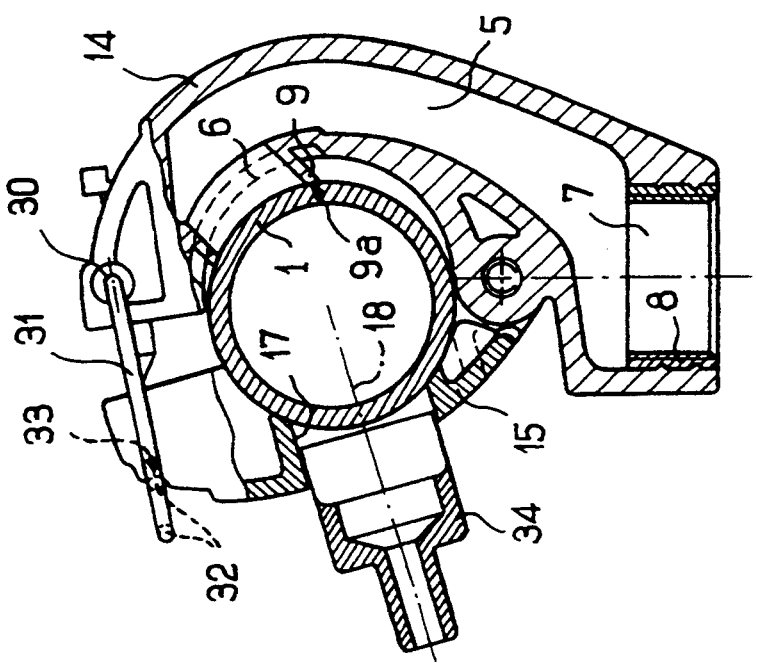

The clamp 3 is the same as shown in the preceding figures, and in FIG. 4 it is shown partially in section and partially in outside view for the free ends of the half-collar parts 14 and 15. The free end of the first part 14 includes two blind cylindrical housings 30 parallel to the axis of the tube 2 on which the clamp is mounted. Each of these housings receives the free end of a respective branch of a U-shaped metal wire loop thereby enabling the loop to pivot. Opposite from its ends received in the housings 30, the loop has a cross-piece 32 of a shape suitable for being resiliently snapped into a groove 33 formed in the outside surface of the free end of the other half-collar part 15 when it is closed against the half-collar second part 14 around the pipe 1.

The pipe 1 does not have the orifice 2 of the preceding figures. The clamp is thus held closed onto the tube by means of the loop 31. The concave face of half-collar second part 15 is a cylindrical surface that bears against the pipe, while the other first part 14 of the clamp bears against the pipe via the end of its endpiece 9 which has a cylindrical annular surface 9a enabling it to engage the outside surface of the pipe 1 properly when said surface is not coaxial with the clamp.

With the clamp thus temporarily installed on the pipe, its opening 17 through the half-collar second part 15 serves as a drilling guide or jig, e.g. for a bell-shaped drill bit 34 enabling the orifice 2 to be made cleanly. Such a bit acts by friction against the surface of the pipe causing it to melt and enabling a pellet to be cut out without forming any swarf, the cutout pellet remaining held by the bit.

Once the orifice has been made, the clamp is removed by lifting the loop 31 and the endpiece 9 is then engaged in the newly-formed orifice.

Figure 6:
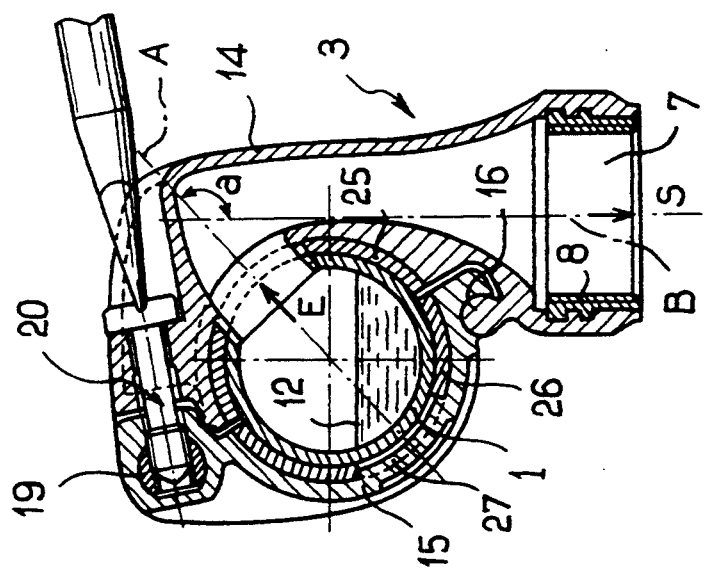
FIG. 6 shows how a branch clamp in accordance with the invention is fixed, where the means for coupling the clamp to the branch pipe are offset relative to the axis of the main pipe.
Figure 5:
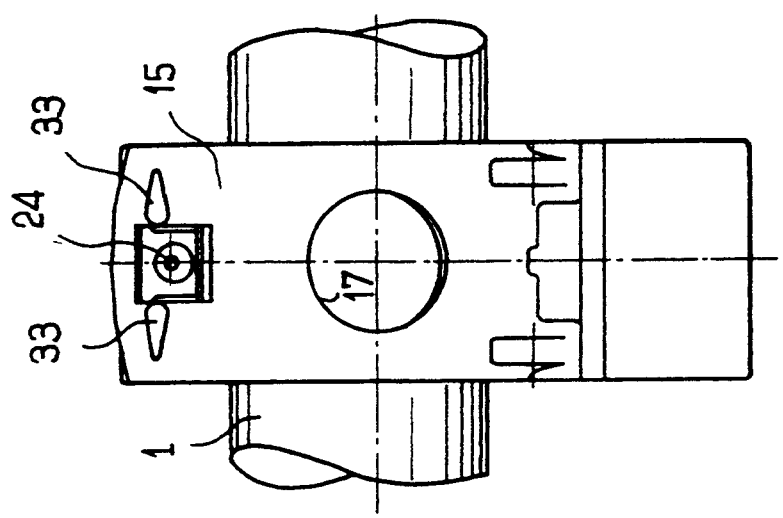
FIGS. 4 and 5 show additional means of a clamp of the invention enabling it to be installed on a main pipe that is not pierced.

FIG. 6 is a section view through a variant embodiment of a clamp of the invention in which its zone 4 for overlying the portion of the pipe 1 surrounding the orifice 2 has a cylindrical surface supporting one or more originally plane gaskets 25 that are then pressed and curved against the concave surface of the zone 4 and are indexed in position in said zone 4 by endpieces 9 in the form of studs for centering and holding said gaskets. The thickness of the gaskets is selected as a function of the outside diameter of the pipe 1 in order to accommodate dimensional variations due to manufacturing tolerances relating to said pipe or in order to compensate for differences that exist when a clamp is designed to be fitted to a pipe having a given metric diameter and when the clamp is actually fitted to a similarly-sized pipe having a diameter designed in inches. Naturally, the clamps 3 exist in a range of sizes having zones 4 of diameters that correspond to the nominal dimensions of different sizes of pipe 1.

Like the zone 4, the second part 15 has a substantially semi-cylindrical inside surface that carries gaskets 26 of a thickness selected to secure the clamp 3 closely on a pipe 1 once the half-collar second part 15 is fastened to the first part 14. It is advantageous for the gaskets 26 to be identical to the gaskets 25, and in order to install them properly in the half-collar second part 15, the second part 15 includes one or two studs 27 of outside diameter equal to the outside diameter of the endpieces 9 so as to hold and center the gaskets 26 in the half-collar second part 5.

FIG. 6 also shows that the axis B of the end 7 having the coupling means 8 in this clamp is offset, unlike the other figures where the axis B intersects the axis A on the axis of the pipe 1.

FIGS. 7 to 9 show a clamp of the invention for a branch connection of greater nominal diameter than the branch connections established using the clamps described above. In this case, the nominal diameter of the branch connection is equal to the diameter of the main pipe.

These figures show most of the elements as described above and they are given the same references. The duct 5 inside the first part 14 opens out via two orifices 6a and 6b through the surface at zone 4, each of which orifices is extended by a corresponding endpiece 9 having a groove formed thereabout for receiving a sealing ring 13. The sum of the sections of said orifices 6a and 6b is equal to the through section of the main pipe 1 and of the branch connection.

Symmetrically, the second part 15 of the clamp has two orifices 17a and 17b which, like the orifice 17 described above, serve as drilling guides for a bell-shaped bit that is used for making the two orifices 2 at exactly the right spacing which corresponds to the spacing of the two endpieces that extend from the orifices 6a and 6b.

The clamp shown in these FIGS. 7 to 9 is wider than that shown in the preceding figures so as to cover the two adjacent orifices in the pipe and so as to include the two orifices 6a and 6b. FIG. 7 shows the groove 33 for receiving a holding loop that is similar to the loop 31 described above, but larger.

Finally, it will be observed that the clamp shown in these last three figures has, adjacent to the end 7 of the duct 5 inside the first part 14, both the above-described coupling means 8 and complementary means for performing the coupling differently as an alternative to the means 8.

The means 8 are constituted by a tapped insert for receiving a threaded endpiece of the branch pipe. The other coupling means have an outside thread 40 carried by the cylindrical end of the first part 14 surrounding the end 7 of the duct 5. This outside thread is interrupted by two diametrically opposite flats 41 and 42 which are located on the joint plane between the molded pieces making up the first part 14 so as to ensure that any flash that may exist at the joint does not interfere with the thread and constitute a shape defect.

The thread 40 serves to receive a nut 43 which, in conventional manner, contains internally a stack of two sleeves 44 and 45 between which a deformable ring 46 having teeth can be deformed from a free state where its inside diameter is greater than the outside diameter of the tube constituting the branch pipe (not shown), and a stressed state in which the inside diameter of the ring 46 is smaller than the diameter of the tube so that its teeth bite into the wall of the tube and constitute means for retaining the tube relative to the nut 43. The ring 46 is deformed by compressing the stack of sleeves 44 and 45 by tightening the nut.

This arrangement which is known per se also includes a lip seal for providing sealing between the nut and the clamp.

The branch pipe is inserted into the nut until it comes into abutment against the coupling means 8 in the form of an insert. Subsequently tightening the nut ensures that the pipe is held in place. However, the nut may be tightened before the pipe is inserted: an instant connection coupling is thus provided at the end of the branch clamp.

A clamp in accordance with the invention is preferably put on the market in the form of a kit comprising a single package containing both the clamp and the drill bit for making the orifice(s) 2 in the pipe 1, e.g., plastic pipe. The user can then make such tapping points as are required on the pipe at locations that are appropriate for a given installation.

I claim:

1. A network for distributing a fluid under pressure comprising a substantially horizontal main pipe, secondary pipes branching therefrom, a junction between the main pipe and a secondary pipe provided by a branch clamp having a zone for covering at least one orifice formed in a top half-cylinder of the wall of the main pipe, into which zone there opens out a first end of a branch duct internal to the clamp, the other end of said branch duct being fitted with coupling means for coupling the clamp to the secondary pipe, the axis of the first end of the branch duct and the axis of said coupling means forming an angle a which is obtuse when measured between said axes in the flow direction of fluid flowing along the branch duct.

2. A network according to claim 1, wherein the angle is 135°.

3. A network according to claim 1, wherein the axes intersect on the axis of the main pipe.

4. A network according to claim 1, wherein the wall of the main pipe includes a plurality of orifices covered by a single zone of the clamp.

5. A branch clamp for use in a network according to claim 1 for coupling a secondary pipe to the main pipe, the branch clamp comprising two half-collars that are hinged to each other and that have fastening means at their free ends for closing the clamp and tightening it onto the main pipe, one of the half-collars being in the form of a body having a covering zone into which zone there opens out a first end of a branch duct internal to the clamp, the other end of the branch duct being fitted with coupling means for coupling the clamp to the secondary pipe, the axis of the first end of the branch duct and the axis of said coupling means forming an angle a which is obtuse when measured between said axes in the flow direction of the fluid flowing along the branch duct, the first end opening out into the covering zone via an opening that is extended by an endpiece for centering the clamp on the orifice in the main pipe.

6. A clamp according to claim 5, wherein the half-collar fitted with the endpiece carries a sealing ring at the base of said endpiece.

7. A clamp according to claim 5, wherein the fastening means between the half-collars comprise at least one captive screw on one of the half-collars and a nut on the other one.

8. A clamp according to claim 7, wherein the captive screw is held captive by a nut that co-operates with a non-threaded section of the screw shank between a threaded end and a head.

9. A clamp according to claim 5, wherein the half-collar that does not have the internal duct includes a drilling jig for guiding a tool for making the orifice in the main pipe, the clamp including means for temporarily holding the half-collars in a closed position on the pipe without the orifice.

10. A kit for making at least one branch connection in a fluid distribution network, comprising, in a single package, a clamp according to claim 9, and a bell-shaped drill bit of diameter corresponding to the outside diameter of the endpiece.

11. A branch clamp according to claim 5, including a plurality of orifices, with at least one of them being extended by an endpiece for centering the clamp in one of the corresponding orifices of the main pipe.

12. A clamp according to claim 5, wherein each half-collar is fitted with a plane gasket provided with at least one orifice.

13. A clamp according to claim 12, wherein the plane gaskets of a given clamp are identical, the half-collar that does not include a branch duct including a gasket centering stud of the same size as the endpiece for centering the clamp on the main pipe.

14. A clamp according to claim 5, wherein the other end of the branch duct is fitted with a connection means for the branch pipe where the branch pipe may be instantaneously connected to the clamp.

* * * * *